(12) United States Patent
Kessler et al.

(10) Patent No.: US 7,429,343 B2
(45) Date of Patent: *Sep. 30, 2008

(54) PROCESS FOR PRODUCING POLYOLEFIN MEMBRANE WITH INTEGRALLY ASYMMETRICAL STRUCTURE

(75) Inventors: Erich Kessler, Höchst i. Odw. (DE); Thomas Batzilla, Miltenberg (DE); Friedbert Wechs, Wörth (DE); Frank Wiese, Wuppertal (DE)

(73) Assignee: Membrana GmbH, Wuppertal (DE)

( * ) Notice: Subject to any disclaimer, the term of this patent is extended or adjusted under 35 U.S.C. 154(b) by 380 days.

This patent is subject to a terminal disclaimer.

(21) Appl. No.: 10/502,346

(22) PCT Filed: Jan. 8, 2003

(86) PCT No.: PCT/EP03/00084

§ 371 (c)(1),
(2), (4) Date: Sep. 15, 2004

(87) PCT Pub. No.: WO03/061812

PCT Pub. Date: Jul. 31, 2003

(65) Prior Publication Data

US 2005/0145107 A1    Jul. 7, 2005

(30) Foreign Application Priority Data

Jan. 24, 2002    (DE) ................................ 102 02 594

(51) Int. Cl.
*B29C 65/00*    (2006.01)
*B01D 67/00*    (2006.01)

(52) U.S. Cl. ............... 264/41; 210/500.23; 210/500.36; 264/344

(58) Field of Classification Search ................ 210/644, 210/483, 488, 489, 490, 500.21, 500.23, 210/500.36; 264/41, 344
See application file for complete search history.

(56) References Cited

U.S. PATENT DOCUMENTS

| | | | |
|---|---|---|---|
| 4,247,498 A | 1/1981 | Castro | |
| 4,490,431 A | 12/1984 | Vitzthum et al. | |
| 4,564,488 A | 1/1986 | Gerlach et al. | |
| 4,594,207 A | 6/1986 | Josefiak et al. | |
| 4,664,681 A | 5/1987 | Anazawa et al. | |
| 4,666,607 A | 5/1987 | Josefiak et al. | |
| 4,940,617 A | 7/1990 | Baurmeister | |
| 4,957,943 A | 9/1990 | McAllister et al. | |
| 5,143,312 A | 9/1992 | Baurmeister | |
| 5,238,618 A | 8/1993 | Kinzer | |
| 5,238,623 A | 8/1993 | Mrozinski | |
| 6,375,876 B1 | 4/2002 | Kessler et al. | |
| 6,409,921 B1 | 6/2002 | Muller et al. | |
| 6,497,752 B1 | 12/2002 | Kessler et al. | |

FOREIGN PATENT DOCUMENTS

| | | |
|---|---|---|
| DE | 27 37 745 C2 | 3/1978 |
| DE | A-28 33 493 | 2/1980 |
| EP | 133 882 A2 | 3/1985 |
| EP | A-285 812 | 10/1988 |
| EP | A-299 381 | 1/1989 |
| WO | WO 99 04891 A | 2/1999 |
| WO | WO 00 43113 A | 7/2000 |
| WO | WO 00 43114 | 7/2000 |

OTHER PUBLICATIONS

C. A. Smolders et al., "Liquid-liquid phase separation in concentrated solutions of non-crystallizable polymers by spinodal decomposition", Kolloid-Z. u. Z. Polymere 243, 1971, pp. 14-20.
R.E. Kesting, "Synthetic Polymeric Membranes", John Wiley & Sons, 1985, pp. 261-264.

*Primary Examiner*—Jill L Heitbrink
(74) *Attorney, Agent, or Firm*—Oliff & Berridge, PLC

(57) ABSTRACT

Process for producing an integrally asymmetrical hydrophobic polyolefinic membrane with a sponge-like, open-pored, microporous support structure and a separation layer with a denser structure, using a thermally induced liquid-liquid phase separation process. A solution of at least one polyolefin is extruded to form a shaped object. The solvent used is one for which the demixing temperature of a solution of 25% by weight of the polyolefin in this solvent is 10 to 70° C. above the solidification temperature. After leaving the die, the shaped object is cooled using a liquid cooling medium that does not dissolve the polymer up to the die temperature, until the phase separation and solidification of the high-polymer-content phase take place. The integrally asymmetrical membrane producible in this manner has a porosity of greater than 30% to 75% by volume, a sponge-like, open-pored, microporous support layer without macrovoids and with on average isotropic pores, and on at least one of its surfaces a separation layer with pores <100 nm, if any. The membrane is preferably used for gas separation or gas transfer processes, in particular for oxygenation of blood.

15 Claims, 5 Drawing Sheets

PROCESS FOR PRODUCING POLYOLEFIN MEMBRANE WITH INTEGRALLY ASYMMETRICAL STRUCTURE

CROSS-REFERENCE TO RELATED APPLICATION

The present application is a U.S. national stage application of International Application No. PCT/EP03/00084, filed on Jan. 8, 2003.

BACKGROUND OF THE INVENTION

1. Field of Invention

The invention relates to a process for producing a hydrophobic membrane using a thermally induced phase separation process in accordance with the preamble of Claim 1, the membrane having a sponge-like, open-pored, microporous structure, and to the use of the membrane for gas exchange processes, in particular oxygenation of blood, and for gas separation processes.

2. Description of Related Art

In a multitude of applications in the fields of chemistry, biochemistry, or medicine, the problem arises of separating gaseous components from liquids or adding such components to the liquids. For such gas exchange processes, there is increasing use of membranes that serve as a separation membrane between the respective liquid, from which a gaseous component is to be separated or to which a gaseous component is to be added, and a fluid that serves to absorb or release this gaseous component. The fluid in this case can be either a gas or a liquid containing the gas component to be exchanged or capable of absorbing it. Using such membranes, a large surface can be provided for gas exchange and, if required, direct contact between the liquid and fluid can be avoided.

Membranes are also used in many different ways to separate individual gas components from a mixture of different gases. In such membrane-based gas separation processes, the gas mixture to be separated is directed over the surface of a membrane usable for gas separation. Sorption and diffusion mechanisms result in a transport of the gas components through the membrane wall, with the transport of the individual gas components of the mixture occurring at different rates. This causes an enrichment of the permeate stream passing through the membrane by the most rapidly permeating gas component, while the retentate stream is enriched by the components that permeate less readily.

This ability to separate individual gas components from a gas mixture using membranes finds numerous applications. For example, membrane-based gas separation systems can be used to enrich the oxygen content of air to increase combustion efficiency or to enrich nitrogen in the air for applications requiring an inert atmosphere.

An important application of membrane-based gas exchange processes in the medical field is for oxygenators, also called artificial lungs. In these oxygenators, which are used in open-heart operations, for example, oxygenation of blood and removal of carbon dioxide from the blood take place. Generally, bundles of hollow-fiber membranes are used for such oxygenators. Venous blood flows in this case in the exterior space around the hollow-fiber membranes, while air, oxygen-enriched air, or even pure oxygen, i.e., a gas, is passed through the lumen of the hollow-fiber membranes. Via the membranes, there is contact between the blood and the gas, enabling transport of oxygen into the blood and simultaneously transport of carbon dioxide from the blood into the gas.

In order to provide the blood with sufficient oxygen and at the same time to remove carbon dioxide from the blood to a sufficient extent, the membranes must ensure a high degree of gas transport: a sufficient amount of oxygen must be transferred from the gas side of the membrane to the blood side and, conversely, a sufficient amount of carbon dioxide from the blood side of the membrane to the gas side, i.e., the gas flow or gas transfer rates, expressed as the gas volume transported per unit of time and membrane surface area from one membrane side to the other, must be high. A decisive influence on the transfer rates is exerted by the porosity of the membrane, since only in the case of sufficiently high porosity can adequate transfer rates be attained.

A number of oxygenators are in use that contain hollow-fiber membranes with open-pored, microporous structure. One way to produce this type of membrane for gas exchange, such as for oxygenation, is described in DE-A-28 33 493. Using the process in accordance with this specification, membranes with up to 90% by volume of interconnected pores can be produced from meltable thermoplastic polymers. The process is based on a thermally induced phase separation process with liquid-liquid phase separation. In this process, a homogeneous single-phase solution is first prepared from the thermoplastic polymer and a compatible component that forms a binary system with the polymer, the system in the liquid state of aggregation having a range of full miscibility and a range with a miscibility gap, and this solution is then extruded into a bath that is substantially chemically inert with respect to, i.e., does not substantially react chemically with, the polymer and has a temperature lower than the demixing temperature. In this way, a liquid-liquid phase separation is initiated and, on further cooling, the thermoplastic polymer solidified to form the membrane structure.

The membranes in accordance with DE-A-28 33 493 have an open-pored, microporous structure and also open-pored, microporous surfaces. On the one hand, this has the result that, in gas exchange processes, gaseous substances such as oxygen ($O_2$) or carbon dioxide ($CO_2$) can pass through the membrane relatively unrestricted and the transport of a gas takes place as a "Knudsen flow" combined with relatively high transfer rates for gases or high gas flow rates through the membrane. Such membranes with gas flow rates for $CO_2$ exceeding 1 ml/($cm^2$*min*bar) and for $O_2$ at approximately the same level have gas flow rates that are sufficiently high for oxygenation of blood.

On the other hand, in extended-duration use of these membranes in blood oxygenation or generally in gas exchange processes with aqueous liquids, blood plasma or a portion of the liquid can penetrate into the membrane and, in the extreme case, exit on the gas side of the membrane, even if in these cases the membranes are produced from hydrophobic polymers, in particular polyolefins. This results in a drastic decrease in gas transfer rates. In medical applications for blood oxygenation, this is termed plasma breakthrough.

The plasma breakthrough time of such membranes as producible in accordance with DE-A-28 33 493 is sufficient in most cases of conventional blood oxygenation to oxygenate a patient in a normal open-heart operation. However, these membranes are not suitable for so-called extended-duration oxygenation due to their relatively short plasma breakthrough times. Such membranes also cannot be used for gas separation tasks due to their consistent open-pored structure.

However, in the field of oxygenation, the desire exists for membranes with higher plasma breakthrough times in order to attain higher levels of safety in extended-duration heart operations and to rule out the possibility of a plasma breakthrough that would require immediate replacement of the oxygenator. The aim is also to be able to oxygenate premature infants or in general patients with temporarily restricted lung function long enough until the lung function is restored, i.e., to be able to conduct extended-duration oxygenation. A prerequisite for this is appropriately long plasma breakthrough times. A frequently demanded minimum value for the plasma breakthrough time in this connection is 20 hours.

From EP-A-299 381, hollow-fiber membranes for oxygenation are known that have plasma breakthrough times of more than 20 hours, i.e., there is no plasma breakthrough even under extended use. This is achieved with the otherwise porous membranes by using a barrier layer with an average thickness not exceeding 2 μm and substantially impermeable to ethanol. According to the disclosed examples, the membranes in accordance with EP-A-299 381 have a porosity of at most 31% by volume, since at higher porosity values the pores are interconnected via the membrane wall and communication occurs between the sides of the hollow-fiber membranes, resulting in plasma breakthrough.

The production of these membranes is conducted via a melt-drawing process, i.e., the polymer is first melt-extruded to form a hollow fiber and then hot- and cold-drawn. In this case, only relatively low porosity values are obtained, which means that, in conjunction with the transport occurring in the barrier layer via solution diffusion, the attainable transfer rates for oxygen and carbon dioxide remain relatively low. Moreover, while the hollow-fiber membranes in accordance with EP-A-299 381 exhibit sufficient tensile strength as a result of the pronounced drawing in conjunction with manufacture, they have only a small elongation at break. In subsequent textile processing steps, such as producing hollow-fiber mats, which have proven excellent in the production of oxygenators with good exchange capacity and as are described in EP-A-285 812, for example, these hollow-fiber membranes are therefore difficult to process.

U.S. Pat. No. 4,664,681 discloses polyolefin membranes in particular for gas separation, with a microporous layer and a non-porous separation layer, the membranes also being produced using a melt-drawing process. The properties of these membranes are similar to those described in EP-A-299 381.

Typically, in melt-drawing processes, membranes are formed with slit-shaped pores with pronounced anisotropy, the first main extension of which is perpendicular to the drawing direction and the second main extension perpendicular to the membrane surface, i.e., in the case of hollow-fiber membranes runs between the exterior and interior surfaces of the membrane, so that the channels formed by the pores run in a relatively straight line between the surfaces. In the case in which, for example, mechanical damage in the spinning process causes leaks in the barrier layer, a preferred direction then exists for the flow of a liquid between the interior and exterior surfaces or vice versa, thereby promoting plasma breakthrough.

DE-C-27 37 745 relates to microporous bodies likewise produced using a process with thermally induced liquid-liquid phase separation. During production of the microporous bodies, when the polymer solution is cast onto a substrate, such as a metal plate, the microporous bodies according to DE-C-27 37 745 can also exhibit a surface skin with a structure not having a cellular form, the thickness of the skin being in most cases approximately the thickness of an individual cell wall. DE-C-27 37 745, however, does not state that such microporous bodies with a surface skin are usable for gas exchange processes, in particular extended-duration oxygenation, or for gas separation processes. Moreover, hollow-fiber membranes cannot be produced using the procedure described in DE-C-27 37 745.

In WO 00/43113 and WO 00/43114, integrally asymmetrical polyolefin membranes are disclosed, and processes for producing them described, that are usable for gas exchange, in particular extended-duration oxygenation, or also for gas separation. The processes are likewise based on a thermally induced phase separation process with liquid-liquid phase separation. The membranes according to WO 00/43113 or WO 00/43114 have a support layer with a sponge-like, open-pored, microporous structure and, adjacent to on this support layer on at least one of the surfaces a separation layer with a denser structure. To produce this membrane structure, and in particular the separation layer, the cited specifications for producing the polyolefin solutions employed start with solvent systems consisting of a mixture of a solvent with a non-solvent for the polyolefin, where the properties of the solvent and non-solvent must meet specific requirements. A disadvantage of the processes disclosed in these specifications is that solvent systems must always be used that are mixtures of several components. Such solvent systems are, from experience, complex with respect to the elements of the process that are aimed at reusing the individual components.

SUMMARY OF THE INVENTION

It is therefore an object of the invention to provide a simplified process for producing integrally asymmetrical membranes with a microporous support structure and a separation layer with a denser structure, also in the form of hollow-fiber membranes, that are suited for gas exchange and at high gas exchange levels are impervious over extended periods of time to a breakthrough of hydrophilic liquids, in particular blood plasma, or that are suited for gas separation, the membranes having good qualities for further processing.

The object is achieved by a process for producing an integrally asymmetrical hydrophobic membrane having a sponge-like, open-pored, microporous support structure and a separation layer with a denser structure compared to the support structure, the process comprising at least the steps of:

a) preparing a homogeneous solution from a system comprising 20-90% by weight of a polymer component consisting of at least one polyolefin and 80-10% by weight of a solvent for the polymer component, wherein the system at elevated temperatures has a range in which it is present as a homogeneous solution and on cooling a critical demixing temperature, below the critical demixing temperature in the liquid state of aggregation a miscibility gap, and a solidification temperature, b) rendering the solution to form a shaped object, with first and second surfaces, in a die having a temperature above the critical demixing temperature, c) cooling the shaped object using a cooling medium, conditioned to a cooling temperature below the solidification temperature, at such a rate that a thermodynamic non-equilibrium liquid-liquid phase separation into a high-polymer-content phase and a low-polymer-content phase takes place and solidification of the high-polymer-content phase subsequently occurs when the temperature falls below the solidification temperature, d) possibly removing the low-polymer-content phase from the shaped object, characterized in that a solvent for the polymer component is selected for which, on cooling at a rate of 1° C./min, the demixing temperature of a solution of 25% by weight of the polymer component in this solvent is 10 to 70° C. above the solidification temperature and that, for cooling, the shaped object is brought into contact with a liquid cooling medium that does not dissolve or react chemically with the polymer component at temperatures up to the die temperature.

Surprisingly, it has been shown that, by adhering to these process conditions, integrally asymmetrical membranes are obtained in which at least one surface is formed as a separation layer that covers the adjacent sponge-like, open-pored, microporous support layer and has a denser structure compared to the support layer. The process according to the invention allows the realization of very thin separation layers, whose structure can be adjusted from dense to nanoporous, with pores having an average size of less than 100 nm and in individual cases beyond that. At the same time, the support layer of the membranes produced in this manner has a high volume porosity.

Preferably, the process according to the invention is used to produce integrally asymmetrical membranes with a dense separation layer. In this context, a dense separation layer or dense structure is understood to be one for which no pores are evident based on an examination by scanning electron microscope at 60000× magnification.

The process according to the invention thus permits the production of integrally asymmetrical membranes with a separation layer that is impervious over long periods of time to liquid breakthrough but at the same time gas permeable, and with a support layer with high volume porosity, resulting at the same time in high gas transfer levels for these membranes in gas transfer processes. These membranes find excellent application for extended-duration blood oxygenation, the separation layer of these membranes being responsible for making them impervious over extended periods of time to the breakthrough of blood plasma. At the same time, membranes with a dense separation layer can be produced that allow high gas separation factors to be attained and can be used for gas separation.

DETAILED DESCRIPTION OF PREFERRED EMBODIMENTS

Figure 3:
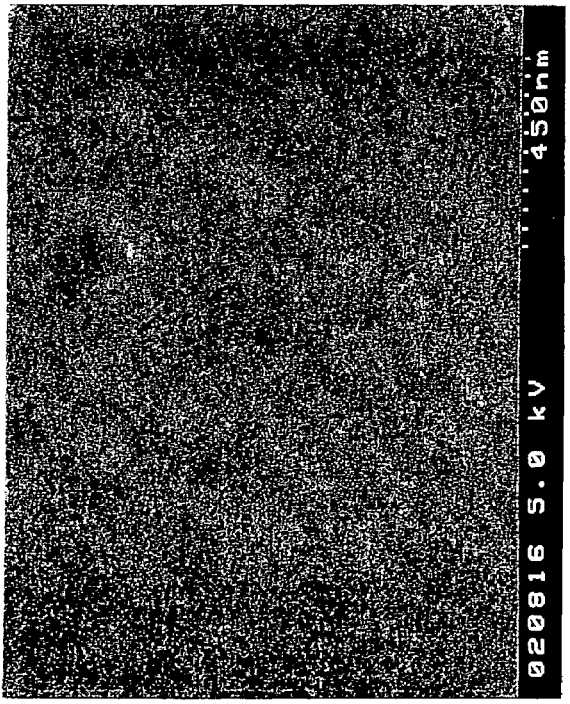
FIG. 3 shows an SEM image of the surface of fracture perpendicular to the longitudinal axis of a hollow-fiber membrane according to example 1 in the vicinity of the exterior surface at 13500× magnification.
Figure 4:
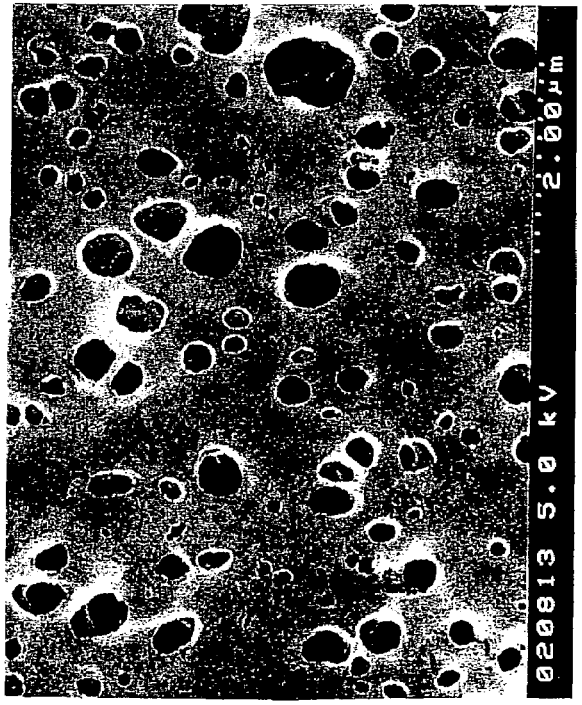
FIG. 4 shows an SEM image of the surface of fracture perpendicular to the longitudinal axis of a hollow-fiber membrane according to example 1 in the vicinity of the interior surface at 13500× magnification.
Figure 1:
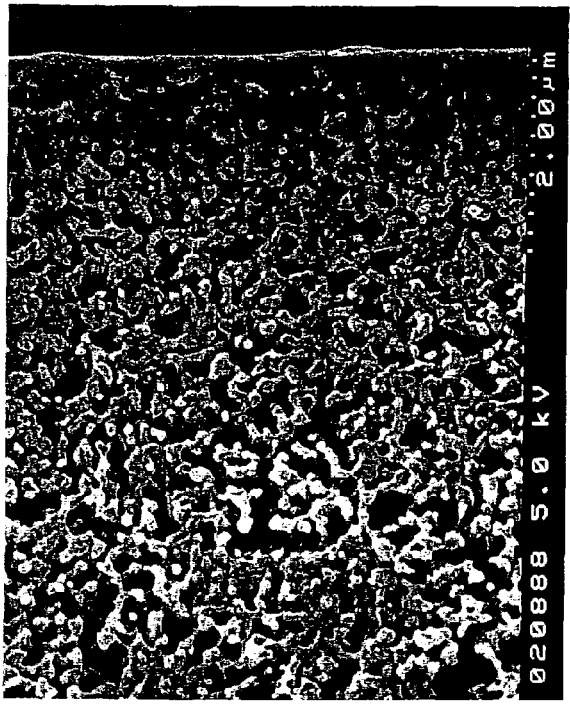
FIG. 1 shows a scanning electron microscope (SEM) image of the exterior surface of a hollow-fiber membrane according to example 1 at 60000× magnification.
Figure 2:
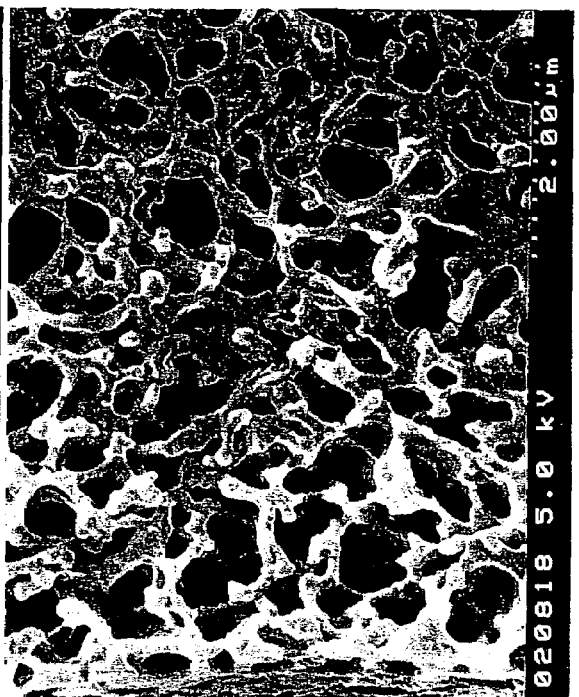
FIG. 2 shows an SEM image of the interior surface of a hollow-fiber membrane according to example 1 at 13500× magnification.

Within the context of the present invention, an integrally asymmetrical membrane is understood to be one in which the separation and support layers consist of the same material and were formed together directly during membrane production, resulting in both layers being integrally joined with each other. In the transition from the separation layer to the support layer, there is merely a change with respect to the membrane structure. Contrasting with this are composite membranes, for example, which have a multilayer structure formed by applying, in a separate process step, a dense layer as a separation layer on a porous, often microporous support layer or support membrane. The result is that the materials constituting the support and separation layers also have different properties in the case of composite membranes.

The process according to the invention is based on a thermally induced phase separation process with liquid-liquid phase separation. According to the invention, the polymer component and the solvent form a binary system, which in the liquid state of aggregation has a range in which the system is present as a homogeneous solution and a range in which it exhibits a miscibility gap in the liquid state of aggregation. If such a system is cooled, from the range in which it is present as a homogenous solution, below the critical demixing or phase separation temperature, liquid-liquid demixing or phase separation into two liquid phases, namely one with a high polymer content and the other with a low polymer content, initially takes place. On further cooling, below the solidification temperature, the high-polymer-content phase solidifies to form a three-dimensional membrane structure. The cooling rate in this case has a substantial influence on the pore structure being created. If the cooling rate is high enough that the liquid-liquid phase separation cannot take place under thermodynamic equilibrium conditions but rather under thermodynamic non-equilibrium conditions and on the other hand still relatively slowly, the liquid-liquid phase separation occurs approximately concurrently with the formation of a large number of droplets of liquid that are of substantially the same size. The resulting polymer object then has a sponge-like cellular and open-pored microstructure. If the cooling rate is significantly higher, the polymer solidifies before most of the droplets of liquid can form. In this case, sponge-like structures with network- or coral-like microstructures are formed. The variety of such sponge-like microporous structures formed via processes with thermally induced liquid-liquid phase separation are described in detail in DE-C-27 37 745, reference to the disclosure of which is hereby explicitly made, and depicted for example in R. E. Kesting, "Synthetic Polymeric Membranes", John Wiley & Sons, 1985, pp. 261-264.

Generally speaking, the solvent is to be seen as a compound in which the polymer component is completely dissolved to form a homogeneous solution when heated to at most the boiling point of this compound. In the context of the present invention, a solvent for the at least one polymer is to be used for which, for a solution of 25% by weight of the polymer component in this solvent and a cooling rate of 1° C./min, the demixing temperature is 10 to 70° C. above the solidification temperature. Such solvents can be categorized as weak solvents for the polymer component. A strong solvent would then be one for which, for a solution of 25% by weight of the polymer component in this solvent and a cooling rate of 1° C./min, the demixing temperature is no more than 5° C. above the solidification temperature.

It has been observed that the use of an overly strong solvent, for which the difference between the demixing and solidification temperatures is less than 10° C. and which results in comparatively low solidification temperatures, promotes the formation of spherulitic or particle-shaped structures and in part defective separation layers. These structures, which are outside the scope of the invention, have a structure consisting of particle-shaped structure elements with in part rosette or laminar construction, where the structure elements are interconnected via laminar or fibrillar links. The membranes produced using the cited solvents, which are outside the scope of the invention, then do not have a sponge-like, open-pored, microporous support structure and furthermore lack sufficient mechanical stability for practical application. On the other hand, the use of overly weak solvents can result in a separation layer that is not free of defects but rather exhibits relatively large holes or splits.

The demixing temperature is preferably 20 to 50° C., and especially preferably 25 to 45° C., above the solidification temperature.

The demixing, or phase separation, temperature and the solidification temperature in this case can be determined in a simple manner by initially preparing a homogeneous solution of 25% by weight of the polymer component in the solvent under investigation and then heating this solution to a temperature approximately 20° C. above the dissolving temperature. This solution is stirred and maintained at this temperature for about 0.5 hours, in order to achieve sufficient homogeneity. Subsequently, the solution is cooled at a rate of 1° C./min while stirring. The phase separation temperature is determined as the temperature at which clouding becomes visible. On further cooling, solidification of the high-polymer-content phase begins with the appearance of individual polymer particles. The solidification temperature is then the temperature at which substantially all of the high-polymer-content phase has solidified.

The formation of spherulitic or particle-shaped structures has also been observed in particular when high-density polyolefins were used. Apparently, when carrying out the process according to the invention, high-density polyolefins have an increased tendency to form spherulitic or particle-shaped structures. It is presumed that the crystallization behavior, such as the crystallization rate, then has an increased effect on the formation of the membrane structure. Preferably, therefore, a polymer component with a density of $\leqq 910$ kg/m$^3$ is employed.

According to the invention, the polymer component used is at least one polyolefin. In this case, the polymer component can be a single polyolefin or a mixture of several polyolefins, where the polyolefins also include polyolefin copolymers or modified polyolefins. Mixtures of different polyolefins are interesting in that various properties such as permeability or mechanical characteristics can be optimized thereby. For example, by adding just slight amounts of a polyolefin with an ultrahigh molecular weight, for example exceeding 10$^6$ daltons, a strong influence can be exerted on the mechanical properties. A prerequisite for this, of course, is that the polyolefins employed in this case together be soluble in the solvent used. In the case that mixtures of several polyolefins are used for the polymer component, in an especially preferred embodiment each polyolefin contained in the mixture has a density of <910 kg/m$^3$.

The at least one polyolefin contained in the polymer component preferably consists exclusively of carbon and hydrogen. Especially preferred polyolefins are polypropylene and poly(4-methyl-1-pentene) or mixtures of these polyolefins among themselves. Of particular advantage is the use of poly(4-methyl-1-pentene). Particularly dense separation layers and high gas transfer rates can be realized thereby, while maintaining good mechanical properties for the membranes.

For the solvent, compounds are to be used that fulfill the stated conditions. In case of the especially preferred use of polypropylene as the polymer component, N,N-bis(2-hydroxyethyl)tallow amine, dioctyl phthalate, or a mixture thereof are preferably used as solvents. In the especially preferred use of poly(4-methyl-1-pentene) as a polyolefin, preferred solvents are palm nut oil, dibutyl phthalate, dioctyl phthalate, dibenzyl ether, coconut oil, or a mixture thereof. Especially dense separation layers are obtained using dibutyl phthalate or dibenzyl ether.

The fractions of polymer component and solvent required for membrane production can be determined by generating phase diagrams in simple experiments. Such phase diagrams can be developed using known methods, such as are described in C. A. Smolders, J. J. van Aartsen, A. Steenbergen, Kolloid-Z. und Z. Polymere, 243 (1971), pp. 14-20.

The polymer fraction of the system from which the solution is formed is preferably 30-60% by weight, and the fraction of the solvent is 70-40% by weight. The polymer fraction is especially preferred to be 35-50% by weight and the fraction of the solvent 65-50% by weight. If necessary, additional substances such as antioxidants, nucleating agents, fillers, components to improve biocompatibility, i.e., blood tolerance when using the membrane in oxygenation, such as vitamin E, and similar substances can be employed as additives to the polymer component, solvent, or polymer solution.

The polymer solution formed from the polymer component and the solvent is given shape using suitable dies. The shaped object preferably has the form of a film or hollow filament, and the membrane ultimately produced therefrom is a flat or hollow-fiber membrane. Conventional dies such as sheeting dies, casting molds, doctor blades, profiled dies, annular-slit dies, or hollow-filament dies can be employed.

In a preferred embodiment, hollow-fiber membranes are produced by the process according to the invention. In this case, the polymer solution is extruded through the annular gap of the corresponding hollow-filament die to form a shaped object, i.e., a hollow filament. A fluid is metered through the central bore of the hollow-filament die that acts as an interior filler that shapes and stabilizes the lumen of the hollow-fiber membrane. The extruded hollow filament or resulting hollow-fiber membrane then exhibits a surface facing the lumen, the interior surface, and a surface facing away from the lumen, the exterior surface, separated from the interior surface by the wall of the hollow filament or hollow-fiber membrane.

After shaping, the shaped object is cooled using the liquid cooling medium employed in accordance with the invention, so that a thermodynamic non-equilibrium liquid-liquid phase separation occurs in the shaped object, i.e., in the shaped polymer solution, and the polymer structure subsequently solidifies and hardens. In this process, the cooling medium has been conditioned to a temperature below the solidification temperature. According to the invention, in order to produce the desired integrally asymmetrical membrane with separation layer, a liquid cooling medium is to be used that does not dissolve or react chemically with the polymer component, even when the medium is heated to the die temperature. The use of such a cooling medium plays a primary role in the formation of a separation layer with a denser structure. Such a requirement placed on the cooling medium rules out, for example, the use as a cooling medium of the solvent employed according to the invention. Although the latter would not dissolve the polymer component at the cooling temperature, this solvent forms a homogeneous solution with the polymer component at the die temperature, as previously noted.

It is especially preferred for the liquid used as the cooling medium to be a non-solvent for the polymer component, i.e., it does not dissolve the polymer component to form a homogeneous solution when heated up to the boiling point of the cooling medium. The liquid used as the cooling medium can also contain a component that is a solvent for the polymer component, or it can also be a mixture of different non-solvents, as long as it overall does not dissolve the polymer component at temperatures up to at least the die temperature. It is observed in this case that the degree of non-solvent character of the cooling medium influences the tightness of the separation layer being formed. In an especially preferred embodiment of the process according to the invention, therefore, a liquid is used as a cooling medium that is a strong non-solvent for the polymer component. In the scope of the present invention, the strength of a non-solvent is assessed on the basis of the difference between the demixing temperature of a solution consisting of the polymer component and a strong solvent and the demixing temperature of a solution containing as a solvent the same solvent and 10% by weight of the non-solvent under investigation. The polymer component concentration in each case is 25% by weight. A strong non-solvent is then understood to be one that leads to an increase in the demixing temperature of at least 10% relative to the demixing temperature of the corresponding solution consisting of only the solvent and the polymer component.

Preferably, the cooling medium at the cooling temperature is a homogeneous, single-phase liquid. This ensures production of membranes with especially homogeneous surface structures.

The liquid cooling medium used can be one that is miscible with the solvent to form a homogeneous solution or one that does not dissolve the solvent. The cooling medium is advantageously a liquid that is a strong non-solvent for the polymer component and is homogeneously miscible with the solvent at the cooling temperature, i.e., in which the solvent dissolves at the cooling temperature.

To initiate a thermodynamic non-equilibrium liquid-liquid phase separation, the temperature of the cooling medium must be significantly below the critical demixing temperature or phase separation temperature of the system used, consisting of the polymer component and solvent, and, in order to solidify the high-polymer-content phase, below the solidification temperature. In this case, the formation of the separation layer is promoted when there is as great a difference as possible between the demixing temperature and the temperature of the cooling medium. The cooling medium preferably has a temperature at least 100° C. below the phase separation temperature, and especially preferably a temperature that is at least 150° C. below the phase separation temperature. It is particularly advantageous if the temperature of the cooling medium in this case is under 50° C. In individual cases, cooling to temperatures below ambient temperature can be required. It is also possible for cooling to be performed in several steps.

The liquid cooling medium in which the shaped object is immersed for cooling and through which it is normally passed, can be located in a tub-shaped container, for example. The liquid cooling medium is preferably in a shaft or spinning tube which the shaped object passes through for cooling purposes. In this case, the cooling medium and shaped object are generally fed in the same direction through the shaft or spinning tube. The shaped object and cooling medium can be fed at the same or different linear speeds through the spinning tube, where, depending on the requirement, either the shaped object or the cooling medium can have the higher linear speed. Such process variants are described in DE-A-28 33 493 or EP-A-133 882, for example.

The interior filler employed in extrusion of hollow filaments can be in gaseous or liquid form. When using a liquid as the interior filler, a liquid must be selected that substantially does not dissolve the polymer component in the shaped polymer solution below the critical demixing temperature of the polymer solution. In other respects, the same liquids can be used as can also be used as the cooling medium. In this manner, hollow-fiber membranes can also be produced that have a separation layer on both their outside and inside, or also hollow-fiber membranes that have a separation layer only on their inside. Preferably, the interior filler is then a non-solvent for the polymer component and especially preferably a strong non-solvent for the polymer component. The interior filler in this case can be miscible with the solvent to form a homogeneous, single-phase solution. In case the interior filler is gaseous, it can be air, a vaporous material, or preferably nitrogen or other inert gases.

It is advantageous if the exit surface of the die and the surface of the cooling medium are spatially separated by a gap, which is transited by the shaped object prior to contact with the cooling medium. The gap can be an air gap, or it can also be filled with another gaseous atmosphere, and it can also be heated or cooled. The polymer solution, however, can also be brought directly into contact with the cooling medium after exiting from the die.

In an advantageous embodiment of the process according to the invention, at least one of the surfaces of the shaped object leaving the die, preferably the surface on which the separation layer is to be formed, is subjected prior to cooling to a gaseous atmosphere promoting the evaporation of the solvent, i.e., to an atmosphere in which the evaporation of the solvent is possible. Preferably, air is used to form the gaseous atmosphere. Likewise preferred are nitrogen or other inert gases or also vaporous media. The gaseous atmosphere is advantageously conditioned and generally has a temperature below that of the die. To evaporate a sufficient fraction of the solvent, at least one of the surfaces of the shaped object is preferably subjected to the gaseous atmosphere for at least 0.5 s. To provide the gaseous atmosphere promoting the evaporation of the solvent, it is often sufficient to spatially separate the die and cooling medium so that a gap is formed between them that contains the gaseous atmosphere and through which the shaped object passes.

In producing flat membranes, for example, the polymer solution extruded through a sheeting die, for example, can, as a flat sheet, initially be passed through a gap, such as an air gap, before being cooled. In this case, the flat sheet is enveloped on all sides, i.e., the two surfaces and the edges, by the gaseous atmosphere, influencing the formation of the separation layer on both surfaces of the resulting flat membrane.

In the case of producing hollow-fiber membranes, the hollow filament leaving the die can likewise be directed through a gap formed between the die and cooling medium and containing the gaseous atmosphere.

In individual cases, the structure of the separation layer can also be influenced by drawing the shaped polymer solution after exiting the die, particularly in the air gap, the drawing being effected by establishing a difference between the exit speed of the polymer solution from the die and the speed of the first withdrawal device for the cooled shaped object.

After cooling and hardening of the polymer structure, the solvent or low-polymer-content phase is usually removed from the shaped object. Removal can be performed, for example, by extraction. Preferably, extraction agents are used that do not dissolve the polymer or polymers but are miscible with the solvent. Subsequent drying at elevated temperatures can be necessary to remove the extraction agent from the membrane. Suitable extraction agents are acetone, methanol, ethanol, and preferably isopropanol.

In some cases, it can also be practical to retain the solvent at least in part in the shaped object. Other components added to the solvent as additives can remain in the membrane structure as well and thus serve as functional active liquids, for example. Various examples of microporous polymers containing functional active liquids are described in DE-C 27 37 745.

Before or after the removal of at least a substantial portion of the solvent, a slight stretching of the membrane can take place in particular to modify the properties of the separation layer in a specific manner. For example, in a substantially dense separation layer, stretching can be used to create pores or the size of pores in the separation layer can be adapted to the size required by the specific application for the resulting membrane.

In producing membranes for extended-duration oxygenation, however, it must be ensured that the average pore size does not exceed 100 nm, so that premature breakthrough of liquid can be avoided. For this reason, the stretching should generally not exceed 10% when producing the membranes of the invention. The stretching can, as required, also be performed in several directions and is advantageously performed at elevated temperatures. For example, such stretching can also be conducted during drying of the membrane that might be necessary after extraction.

By adjusting the pore size of the separation layer, such as in a downstream stretching step, membranes for nanofiltration or ultrafiltration can therefore also be produced by the process according to the invention.

The process according to the invention is preferably used to produce a hydrophobic integrally asymmetrical membrane, in particular for gas separation or gas exchange, wherein the membrane is composed primarily of at least one polyolefin, has first and second surfaces, and has an intermediate support layer with a sponge-like, open-pored, microporous structure and adjacent to this support layer on at least one of the surfaces a separation layer with a denser structure, where the separation layer is dense or has pores with an average diameter <100 nm, the support layer is free of macrovoids, the pores in the support layer are on average substantially isotropic, and the membrane has a porosity in the range from greater than 30% to less than 75% by volume. For this reason, the invention further relates to such a membrane producible by the process according to the invention. It is especially preferable for the membrane produced by the process according to the invention to have a dense separation layer.

The average pore diameter in the separation layer is understood to be the mean of the diameters of the pores in the surface formed as the separation layer, where an image of a scanning electron microscope at 60000× magnification is used as a basis. In the image-analysis evaluation, the pores are assumed to have a circular cross-section. The average pore diameter is the arithmetic mean of all visible pores on a membrane surface of approx. 8 μm×6 μm at 60000× magnification. In the membranes according to the invention and those produced by the process according to the invention, existing pores in the surface exhibiting the separation layer are uniformly, i.e., homogeneously, distributed over this surface.

Due to their structure, these membranes, when used for gas transfer, are distinguished by high gas flow rates and high gas transfer rates while maintaining high levels of safety with respect to a breakthrough of the liquid from which a gaseous component is to be separated or to which a gaseous component is to be added, and also by good mechanical properties. To achieve this, the membrane has a high volume porosity, where the latter is determined substantially by the structure of the support layer, and a defined separation layer with minimal thickness.

The support layer of the membranes produced by the process according to the invention, or the membranes according to the invention, can, as previously discussed, have different structures. In one embodiment, the support layer has a sponge-like, cellular, and open-pored structure, in which the pores can be described as enveloped microcells that are interconnected by channels, smaller pores, or passages. In another embodiment, the support layer has a non-cellular structure, in which the polymer phase and the pores form interpenetrating network structures, which can also be described as coral-shaped structures. In any case, however, the support layer is free of macrovoids, i.e., free of such pores often referred to in the literature as finger pores or caverns.

The pores of the support layer can have any geometry and be, for example, of elongated, cylindrical, rounded shape, or also have a more or less irregular shape. In the membranes according to the invention or those produced by the process according to the invention, the pores in the support layer are on average substantially isotropic. This is understood to mean that, although the individual pores can also have an elongated shape, the pores on average in all spatial directions have substantially the same extension, where deviations of up to 20% can exist between the extensions in the individual spatial directions.

With an insufficiently low volume porosity, i.e. an insufficient pore fraction compared to the total volume of the membrane, the attainable gas flows and gas transfer rates are too low. On the other hand, an excessive pore fraction in the membrane leads to deficient mechanical properties, and the membrane cannot be readily processed in subsequent processing steps. Using the process according to the invention, preferably membranes can be produced that have a volume porosity in the range of greater than 30% to less than 75% by volume and especially preferably greater than 50% to less than 65% by volume.

Furthermore, the membranes can have a separation layer on only one of their surfaces, or they can have a separation layer on both surfaces. The separation layer influences on the one hand the gas flows and gas transfer rates but on the other hand the breakthrough time, i.e., the time the membrane is protected from a breakthrough of the liquid from which, when using the membrane according to the invention, a gaseous component is to be separated or to which a gaseous component is to be added, or from a breakthrough of components contained in the liquid. It also influences whether and how well various gases in a gas mixture can be separated from one another, i.e., the gas separation factor $\alpha(CO_2/N_2)$, for example.

With a non-porous, dense separation layer, very long breakthrough times are the result, but the transfer rates and gas flows are limited in size, since in non-porous membrane layers the gas transfer or gas flow takes place solely via a comparatively slow solution diffusion, in contrast to the considerably greater "Knudsen flow" in porous structures. In the case of a nanoporous separation layer, on the other hand, the gas transfer rates and gas flows are higher than those with a dense separation layer, but reduced breakthrough times can result due to the pores.

The tightness of the separation layer and its suitability in particular for gas separation or gas transfer can often not be evaluated with sufficient reliability solely on the basis of visual inspection, using a scanning electron microscope for example. In this case, not only the size of existing pores or in general structural defects such as fissures but also their number play a role. However, the absence or presence of pores and/or defects, as well as their number, can be evaluated by examining the gas permeation and gas flows through the membrane as well as the gas separation factors.

It is well known that the general principles of gas transport in polymer membranes depend on the pore size in the membrane. In membranes in which the separation layer has pores at most approx. 2-3 nm in size, the gas permeates through this membrane via solution diffusion mechanisms. The permeability coefficient $P_0$ of a gas then depends solely on the polymer material of the membrane and on the gas itself, and the gas flow $Q_0$, i.e., the permeability coefficient divided by the membrane thickness, depends, for a given gas, only on the thickness of the separation layer. The gas separation factor $\alpha$, which specifies the ratio of the permeability coefficients or the gas flows Q of two gases in this membrane, therefore depends likewise solely on the polymer material and not, for example, on the thickness of the separation layer. For example, the gas separation factor for $CO_2$ and $N_2$ is then $\alpha_0(CO_2/N_2)=P_0(CO_2)/P_0(N_2)$. For polymers in general use, resulting $\alpha_0(CO_2/N_2)$ values are at least 1 and generally at least 3.

In porous membranes with pores between 2 nm and about 10 μm in size, the transport of gases takes place primarily via "Knudsen flow". The calculated gas separation factors $\alpha_1$, as the ratio of the measured apparent permeability coefficients, are then inversely proportional to the square root of the ratio of the molecular weights of the gases. For $\alpha_1(CO_2/N_2)$, therefore, the result is $\sqrt{28/44}=0.798$, for example.

If a gas permeates the membranes of the present invention, which have a microporous support structure and compared with it a denser separation layer with pores not exceeding 100 nm on average, the permeation through the separation layer is the step that determines the rate. If this separation layer has a significant number of pores or defects, on the one hand the apparent permeability coefficients increase, but on the other hand the gas separation factor decreases. For this reason, the presence or absence of pores and/or defects in the separation layer of the membranes of the invention can be determined on the basis of the measured gas separation factors for $CO_2$ and $N_2$, $\alpha(CO_2/N_2)$. If the $CO_2/N_2$ gas separation factor $\alpha(CO_2/N_2)$ is significantly less than 1, the membrane has an excessive number of pores or defects in the separation layer. If the number of pores or defects in the separation layer is too high, however, a premature liquid breakthrough or plasma breakthrough can no longer be ruled out with adequate certainty, and the membranes are not suitable for extended-duration use in blood oxygenation. Such membranes are likewise unsuitable for gas separation applications. The membranes of the invention, therefore, preferably have a gas separation factor $\alpha(CO_2/N_2)$ of at least 1, and especially preferably at least 2.

The separation layer must not be too thin, since this increases the risk of defects and thus of breakthrough, and the resulting $\alpha(CO_2/N_2)$ values are too low. However, the time to actual breakthrough is still relatively long in this case, since with the membranes of the invention there is no preferred direction for the flow of a liquid; rather, the course of the liquid is tortuous due to the pore structure. Contrasting with this are membranes produced according to the aforementioned melt-drawing process, in which, due to the pronounced anisotropy of the pores, a preferred direction for the flow of the liquids from one surface to the other results.

While an excessively thin separation layer makes the risk of defects too great, an excessive separation layer thickness makes the transfer rates and gas flow rates too low. Preferably, therefore, the thickness of the separation layer is between 0.01 μm and 5 μm, especially preferably between 0.1 μm and 2 μm. Membranes of the invention with a separation layer thickness between 0.1 μm and 0.6 μm are excellently suited. The thickness of the separation layer can be determined for the membranes of the invention in a simple manner by measuring the layer using fracture images generated by scanning electron microscopy or by ultrathin-section characterizations using transmission electron microscopy. In conjunction with the high porosity of the membranes, this permits the attainment of a sufficiently high permeability of the membranes for use in blood oxygenation and thus sufficiently high gas flows. Preferably, therefore, the membranes of the invention have a gas flow Q for $CO_2$, $Q(CO_2)$, of at least 1 ml/(cm$^2$*min*bar).

An important application of the membranes producible by the process according to the invention is the oxygenation of blood. In these applications, as previously noted, the plasma breakthrough time plays a role, i.e., the time in which the membrane is stable against a breakthrough of blood plasma. It must be emphasized that plasma breakthrough is a considerably more complex process than the mere penetration of a hydrophobic membrane by a hydrophilic liquid. According to accepted opinion, plasma breakthrough is induced by the fact that initially proteins and phospholipids in the blood effect a hydrophilation of the pore system of the membrane, and in a subsequent step a sudden penetration of blood plasma into the hydrophilated pore system takes place. The critical variable for a liquid breakthrough is therefore considered to be the plasma breakthrough time. The membranes of the invention preferably exhibit a plasma breakthrough time of at least 20 hours, and especially preferably a plasma breakthrough time of at least 48 hours.

In general, in the membranes of the present invention, the transition from the porous support layer to the separation layer takes place in a narrow region of the membrane wall. In a preferred embodiment, the membrane structure changes abruptly in the transition from the separation layer to the support layer, i.e., the membrane structure changes substantially transition-free and step-like from the microporous support structure to the separation layer. Membranes with such a structure have, in comparison to membranes with a gradual transition from the separation layer to the support layer, the advantage of higher permeability of the support layer for gases to be transferred, since the support layer is less compact in its area adjacent to the separation layer.

In a preferred embodiment, the membranes of the invention or those produced by the process according to the invention are flat membranes, which preferably have a thickness between 10 and 300 µm, especially preferably between 30 and 150 µm. In a likewise preferred embodiment, the membranes are hollow-fiber membranes. Depending on the embodiment, they can have a separation layer only on their interior surface, i.e. on the surface facing the lumen, or only on their exterior surface, i.e. the surface facing away from the lumen, or on both the interior and exterior surfaces. The separation layer is preferably on the exterior surface. The hollow-fiber membranes preferably have an outside diameter between 30 and 3000 µm, especially preferably between 50 and 500 µm. A wall thickness of the hollow-fiber membrane between 5 and 150 µm is advantageous, and a thickness between 10 and 100 µm is especially advantageous. The hollow-fiber membranes have outstanding mechanical properties, in particular a breaking force of at least 70 cN and an elongation at break of at least 75%, readily enabling processing in subsequent textile processing steps. When using hollow-fiber membranes, it has proven beneficial for the hollow-fiber membranes, with respect to the performance characteristics of membrane modules made therefrom, to be initially formed, for example, by appropriate knitting processes into mats of hollow-fiber membranes substantially parallel to each other, which are then fashioned into appropriate bundles. The associated textile processes impose stringent demands on the mechanical properties of the membranes, in particular on the tensile strength and elongation. These requirements are fulfilled by the membranes of the invention and those produced by the process according to the invention.

The membranes of the invention or those produced according to the invention can be used in numerous applications in which a membrane is required with a separation layer. Preferred applications are processes for gas separation, in which, for example, a single gas component is selectively separated from a mixture of at least two gases, or for gas enrichment, in which one or more gas components in a mixture of different gases is enriched. Furthermore, the membranes of the invention or those produced according to the invention can be used for gas transfer processes, in which a gas dissolved in a liquid is selectively removed from this liquid, and/or a gas from a mixture of gases, for example, is dissolved in a liquid. Due to their high impermeability for plasma, i.e. to their long plasma breakthrough times, and their high gas transfer capacity for $O_2$ and $CO_2$, the membranes of the invention are excellently suited for use in oxygenators, i.e., for the oxygenation of blood and in particular for the extended-duration oxygenation of blood. On the other hand, in the process according to the invention, adjustment of the pore size of the separation layer, for example in a downstream stretching step, also preferably permits production of membranes for nanofiltration, such as for separating low-molecular substances chiefly from non-aqueous media, or for ultrafiltration, such as for treating fresh water, sewage, or process water, as well as for applications in the food, beverage, and dairy industries. The membranes of the invention and those produced using the process of the invention can moreover also be used advantageously for separation or recovery of anesthesia gases, which have a considerably greater molecular diameter compared to the gases contained in respiratory air.

In the examples, the following methods were employed to characterize the membranes obtained:

Determination of the Plasma Breakthrough Time:

To determine the plasma breakthrough time, a phospholipid solution maintained at 37° C. (1.5 g L-α-Phosphatidy-LCholine dissolved in 500 ml physiological saline solution) is directed with a flow of 6 l/(min*2 m$^2$) at a pressure of 1.0 bar along one surface of a membrane sample. Air is allowed to flow along the other surface of the membrane sample, the air after exiting the membrane sample being fed through a cooling trap. The weight of the liquid accumulated in the cooling trap is measured as a function of time. The time until the occurrence of a significant increase in the weight, i.e., to the first significant accumulation of liquid in the cooling trap, is designated as the plasma breakthrough time.

Determination of the Volume Porosity:

A sample of at least 0.5 g of the membrane to be examined is weighed in a dry state. The membrane sample is then placed for 24 hours into a liquid that wets the membrane material but does not cause it to swell, so that the liquid penetrates into all pores. This can be detected visually in that the membrane sample is transformed from an opaque to a glassy, transparent state. The membrane sample is then removed from the liquid, liquid adhering to the sample removed by centrifugation at about 1800 g, and the mass of the thus pretreated wet, i.e., liquid-filled, membrane sample determined.

The volume porosity in % is determined according to the following formula:

$$\text{Volume porosity } [\%] = 100 * \frac{(m_{wet} - m_{dry})/\rho_{liq.}}{(m_{wet} - m_{dry})/\rho_{liq.} + m_{dry}/\rho_{polymer}}$$

where
$m_{dry}$=weight of the dry membrane sample
$m_{wet}$=weight of the wet, liquid-filled membrane sample
$\rho_{liq.}$=density of the liquid used
$\rho_{polymer}$=density of the membrane polymer Determination of the Gas Flow:

To determine the gas flows, one of the sides of a membrane sample is subjected to the gas to be measured, under a constant test pressure of 2 bar. In the case of hollow-fiber membranes, the gas is introduced into the lumen of the hollow-fiber membrane for this purpose. The volume stream of the gas penetrating through the wall of the membrane sample is determined and standardized with respect to the test pressure and area of the membrane sample penetrated by the gas stream. For hollow-fiber membranes, the interior surface of the membrane enclosing the lumen is employed for this.

Determination of the Average Diameter of the Pores in the Separation Layer:

The determination of the average diameter of the pores in the separation layer is performed using an image-analysis technique. For this purpose, the pores are assumed to have a circular cross-section. The average pore diameter is then the arithmetic mean of all visible pores on a membrane surface of approx. 8 µm×6 µm at 60000× magnification.

EXAMPLE 1

Poly(4-methyl-1-pentene) was melted stepwise in an extruder at increasing temperatures ranging from 265° C. to 300° C. and fed continuously to a dynamic mixer using a gear pump. The solvent used, dibutyl phthalate (Palatinol C); was also fed, via a metering pump, to the mixer, in which the polymer and solvent were processed together at a temperature of 290° C. to form a homogeneous solution with a polymer concentration of 35% by weight and a solvent concentration of 65% by weight. This solution was fed to a hollow-filament die with an outside diameter of the annular gap of 1.2 mm and extruded above the phase separation temperature at 240° C. to form a hollow filament. Nitrogen was used as the interior filler. After an air section of 20 mm, the hollow filament passed through an approx. 1 m long spinning tube, through which the cooling medium, conditioned to ambient temperature, flowed. The cooling medium used was glycerin triacetate. The hollow filament, solidified as a result of the cooling process in the spinning tube, was drawn off from the spinning tube at a rate of 72 m/min, wound onto a spool, subsequently extracted with isopropanol, and then dried at 120° C.

A hollow-fiber membrane was obtained with an outside diameter of approx. 415 µm, a wall thickness of approx. 90 µm, and a porosity of 57% by volume. The outside of the membrane had an approx. 0.3 µm thick separation layer, and the SEM examination of the exterior surface at 60000× magnification indicated no pores (FIGS. 1 to 4). For the membrane according to this example, a $CO_2$ flow of 4.65 ml/(cm$^2$*min*bar), an $N_2$ flow of 0.54 ml/(cm$^2$*min*bar), and thus a gas separation factor $\alpha(CO_2/N_2)$ of approx. 8.6 were determined. The membrane exhibited a plasma breakthrough time of more than 72 hours. After this time, the measurement was discontinued.

EXAMPLE 2

The procedure of example 1 was followed using dibenzyl ether as the solvent.

Figure 5:
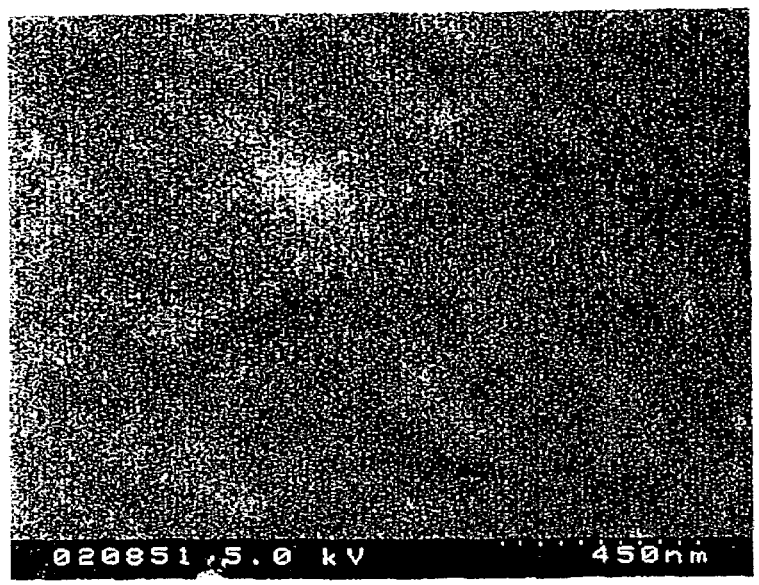
FIG. 5 shows an SEM image of the exterior surface of a hollow-fiber membrane according to example 2 at 60000× magnification.
Figure 6:
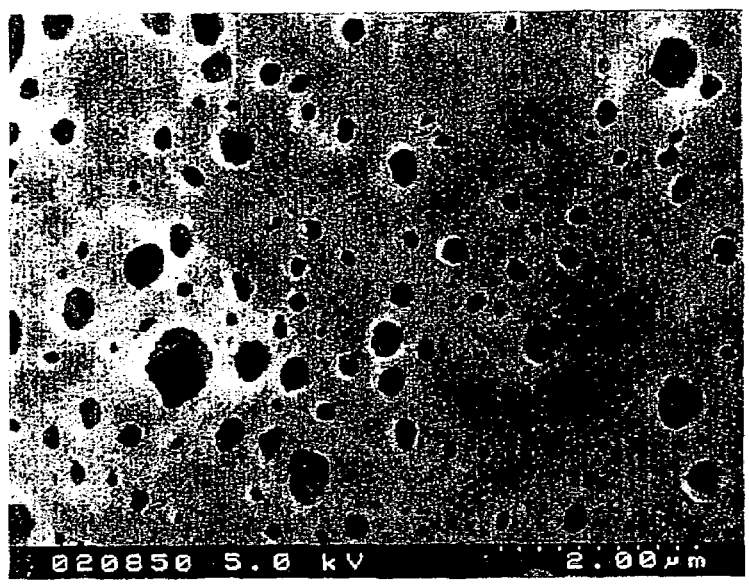
FIG. 6 shows an SEM image of the interior surface of a hollow-fiber membrane according to example 2 at 13500× magnification.
Figure 7:
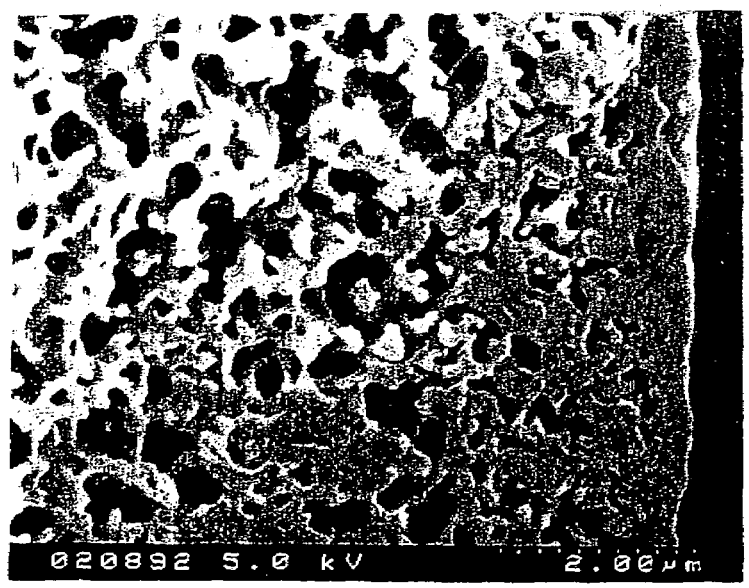
FIG. 7 shows an SEM image of the surface of fracture perpendicular to the longitudinal axis of a hollow-fiber membrane according to example 2 in the vicinity of the exterior surface at 13500× magnification.

The hollow-fiber membrane obtained thereby had an outside diameter of approx. 400 µm, a wall thickness of approx. 95 µm, and a porosity of approx. 56% by volume. The membrane likewise had a sponge-like, microporous support structure and a 0.1 to 0.3 µm thick separation layer on its outside, and the SEM examination of the exterior surface at 60000× magnification indicated no pores (FIGS. 5 to 7). For the membrane according to this example, on average, a $CO_2$ flow of 2.58 ml/(cm$^2$*min*bar), an $N_2$ flow of 0.83 ml/(cm$^2$*min*bar), and a gas separation factor $\alpha(CO_2/N_2)$ of 3.1 were determined. A plasma breakthrough time of more than 72 hours was determined for the membrane.

EXAMPLE 3

The procedure of example 1 was followed using coconut oil as the solvent. The mixer temperature was 285° C.

Figure 8:
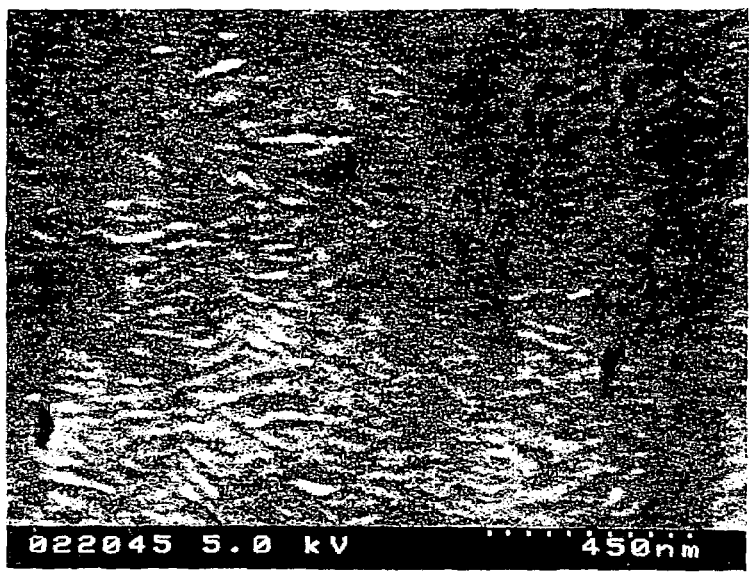
FIG. 8 shows an SEM image of the exterior surface of a hollow-fiber membrane according to example 3 at 60000× magnification.
Figure 9:
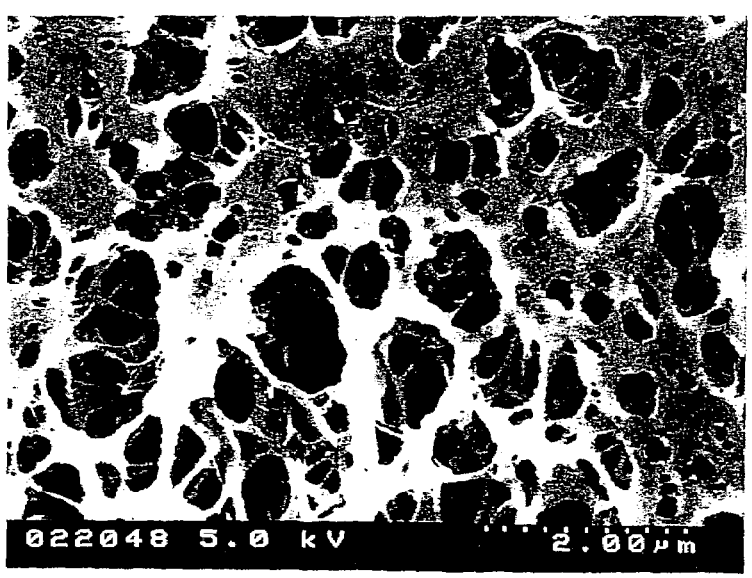
FIG. 9 shows an SEM image of the interior surface of a hollow-fiber membrane according to example 3 at 13500× magnification.
Figure 10:
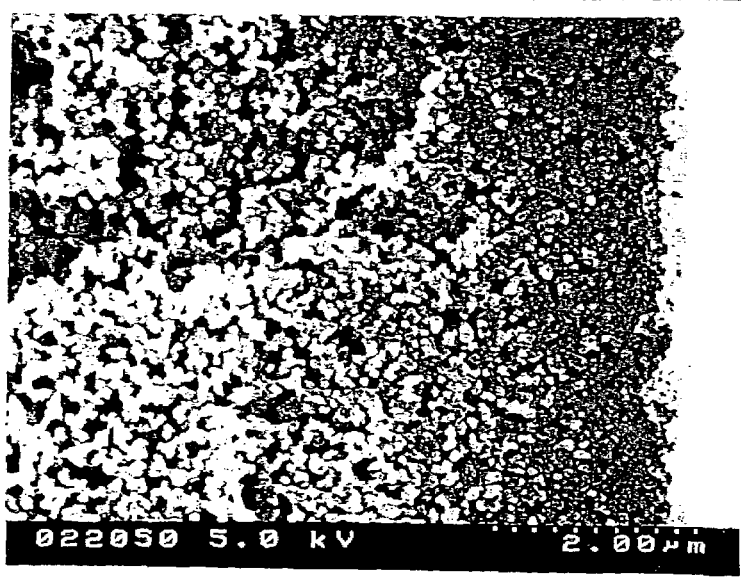
FIG. 10 shows an SEM image of the surface of fracture perpendicular to the longitudinal axis of a hollow-fiber membrane according to example 3 in the vicinity of the exterior surface at 13500× magnification.

The resulting hollow-fiber membrane had dimensions similar to those in example 2. On its outside, it had a thin separation layer with individual pores up to approx. 100 nm (FIGS. 8 to 10). The $CO_2$ and $N_2$ flows for the membrane of this example were on the same order of magnitude, from 64 to 76 ml/(cm$^2$*min*bar).

EXAMPLE 4

The membrane was produced as for that in example 1. The solvent used, however, was palm nut oil. For cooling, a glycerin/water mixture in a ratio of 65:35 was employed. The mixer temperature was set to 265° C.

Figure 11:
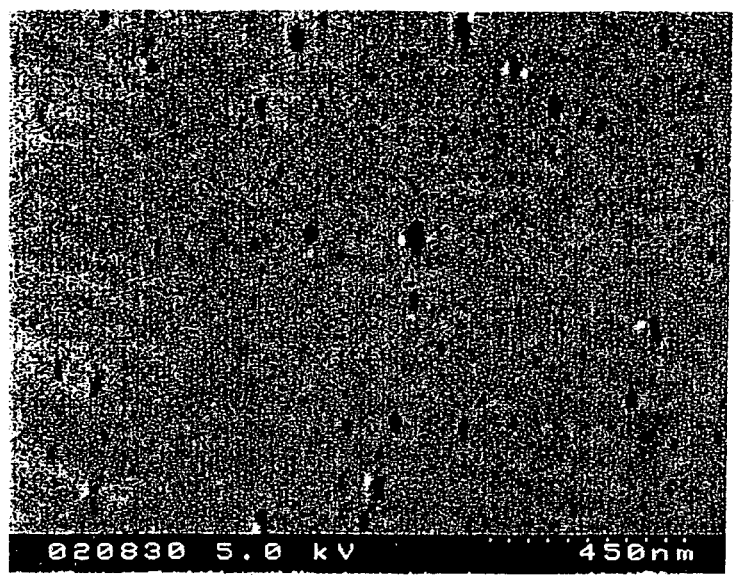
FIG. 11 shows an SEM image of the exterior surface of a hollow-fiber membrane according to example 4 at 60000× magnification.
Figure 12:
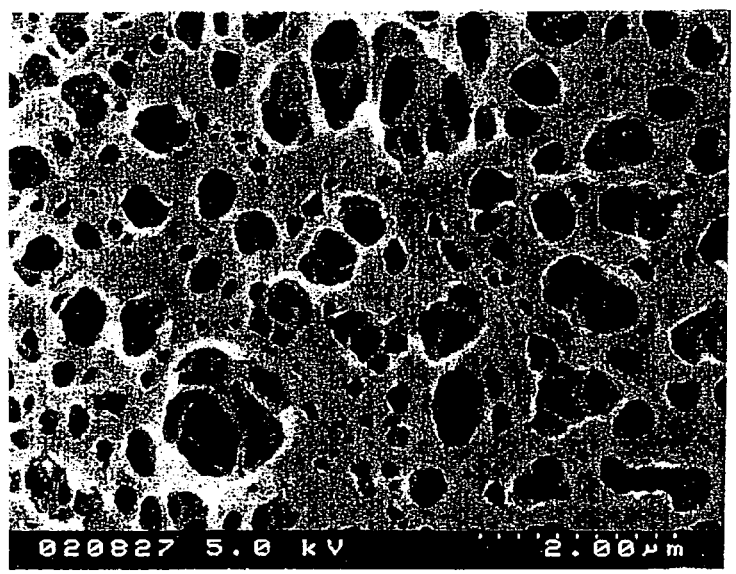
FIG. 12 shows an SEM image of the interior surface of a hollow-fiber membrane according to example 4 at 13500× magnification.
Figure 13:
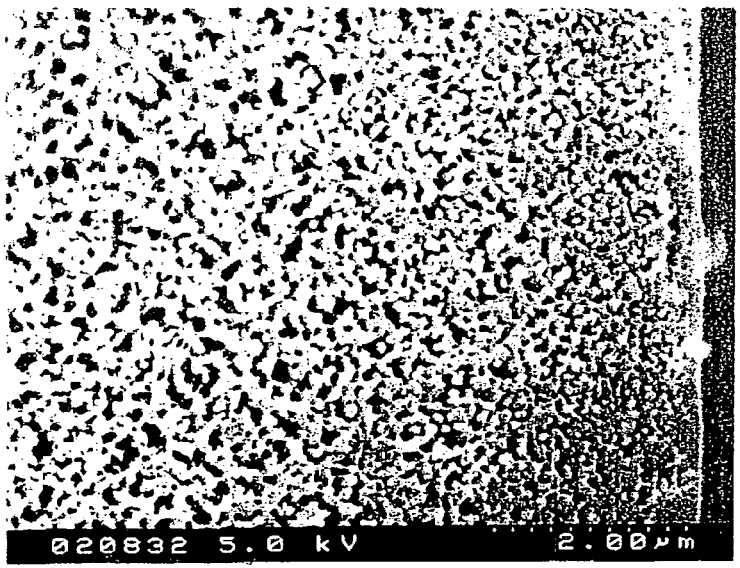
FIG. 13 shows an SEM image of the surface of fracture perpendicular to the longitudinal axis of a hollow-fiber membrane according to example 4 in the vicinity of the exterior surface at 13500× magnification.
Figure 16:
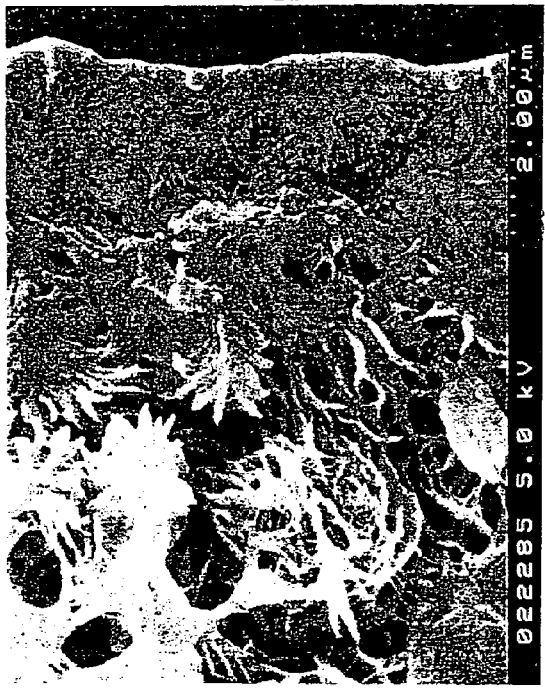
FIG. 16 shows an SEM image of the surface of fracture perpendicular to the longitudinal axis of a hollow-fiber membrane according to comparative example 1 in the vicinity of the exterior surface at 13500× magnification.
Figure 17:
FIG. 17 shows an SEM image of the surface of fracture perpendicular to the longitudinal axis of a hollow-fiber membrane according to comparative example 1 in the vicinity of the interior surface at 13500× magnification.

The hollow-fiber membrane produced thereby had an outside diameter of 406 µm and a wall thickness of 96 µm. The membrane porosity exceeded 55% by volume. The membrane had a sponge-like, microporous support structure and an approx. 0.2 µm thick separation layer on its outside. In the SEM examination, numerous pores up to approx. 80 nm in size were observable in the exterior surface of the membrane, i.e., in the separation layer (FIGS. 11 to 13). The $CO_2$ and $N_2$ flows were 179 and 202 ml/(cm$^2$*min*bar), respectively, yielding a gas separation factor $\alpha(CO_2/N_2)$ of 0.89.

COMPARATIVE EXAMPLE 1

The procedure of example 1 was followed. Dioctyl adipate was used as the solvent. For dioctyl adipate, the demixing temperature of a solution of 25% by weight of the poly(4-methyl-1-pentene) employed as the polymer component was only approx. 5° C. above the solidification temperature and thus below the minimum level of 10° C. required by the invention. Glycerin triacetate was used as the cooling medium and was maintained at ambient temperature.

Figure 14:
FIG. 14 shows an SEM image of the exterior surface of a hollow-fiber membrane according to comparative example 1 at 60000× magnification.
Figure 15:
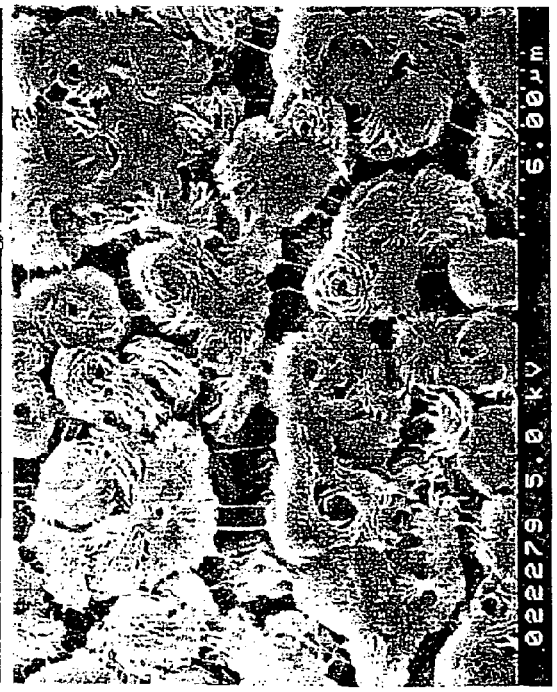
FIG. 15 shows an SEM image of the interior surface of a hollow-fiber membrane according to comparative example 1 at 4500× magnification.

The hollow-fiber membranes produced thereby had an integrally asymmetrical structure with a dense separation layer, although the separation layer was relatively thick at approx 3 µm. The support structure adjacent to the separation layer was not sponge-like but rather consisted of particle-shaped structure elements, with the structure elements interconnected via laminar or fibrillar links (FIGS. 14. to 17). Moreover, these membranes, which are outside the scope of the invention, had only a slight mechanical stability.

COMPARATIVE EXAMPLE 2

The membrane was produced using the process of comparative example 1. Instead of dioctyl adipate, isopropyl myristate was used as the solvent. For isopropyl myristate as well, the demixing temperature of a solution of 25% by weight of the poly(4-methyl-1-pentene) employed as the polymer component was only approx. 5° C. above the solidification temperature and thus below the minimum level of 10° C. required by the invention.

The hollow-fiber membranes produced thereby were similar to those for comparative example 1 and had an integrally asymmetrical structure with a compact, approx. 2 µm thick separation layer. The support structure adjacent to this separation layer likewise consisted of particle-shaped structure elements interconnected via laminar or fibrillar links. Moreover, these membranes, which are outside the scope of the invention, had only a slight mechanical stability.

The invention claimed is:

1. Process for producing an integrally asymmetrical hydrophobic membrane consisting of at least one polyolefin, the membrane having a sponge-like, open-pored, microporous support structure and a separation layer with a denser structure compared to the support structure, the process comprising at least the steps of:
   a) preparing a homogeneous solution from a system comprising 20-90% by weight of the at least one polyolefin and 80-10% by weight of a solvent for the at least one polyolefin, wherein the system at elevated temperatures has a range in which it is present as a homogeneous solution, on cooling has a critical demixing temperature, below the critical demixing temperature in the liquid state of aggregation has a miscibility gap, and has a solidification temperature, b) rendering the solution to form a shaped object, with first and second surfaces, in a die at a die temperature above the critical demixing temperature, c) cooling the shaped object by contacting the shaped object with a liquid cooling medium that does not dissolve or react chemically with the at least one polyolefin at temperatures up to the die temperature, the liquid cooling medium being conditioned to a cooling temperature below the solidification temperature, at such a rate that a thermodynamic non-equilibrium liquid-liquid phase separation into a high-polymer-content phase and a low-polymer-content phase takes place and solidification of the high-polymer-content phase subsequently occurs when the temperature of the shaped object falls below the solidification temperature, and d) optionally removing the low-polymer-content phase from the shaped object, wherein a solvent for the at least one polyolefin is selected for which, on cooling at a rate of 1° C./min, the demixing temperature of a solution of 25% by weight of the at least one polyolefin in the solvent is 10 to 70° C. above the solidification temperature.

2. Process for producing a membrane according to claim 1, wherein the solvent for the at least one polyolefin is one for which, for a solution of 25% by weight of the at least one polyolefin in the solvent and a cooling rate of 1° C./min, the critical demixing temperature is 20 to 50° C. above the solidification temperature.

3. Process for producing a membrane according to claim 1, wherein the solvent for the at least one polymer is one for which, for a solution of 25% by weight of the at least one polyolefin in the solvent and a cooling rate of 1° C./min, the critical demixing temperature is 25 to 45° C. above the solidification temperature.

4. Process for producing a membrane according to claim 1, wherein the at least one polyolefin has a density of $\leqq 910$ kg/m$^3$.

5. Process for producing a membrane according to claim 1, wherein the liquid cooling medium is a non-solvent for the at least one polyolefin that, on heating up to a boiling point of the non-solvent, does not dissolve the at least one polyolefin to form a homogeneous solution.

6. Process for producing a membrane according to claim 1, wherein the liquid cooling medium is a liquid that is a strong non-solvent for the at least one polyolefin and is homogeneously miscible with the solvent at the cooling temperature.

7. Process for producing a membrane according to claim 1, wherein the liquid cooling medium has a temperature that is at least 100° C. below the critical demixing temperature.

8. Process for producing a membrane according to claim 1, wherein 30-60% by weight of the at least one polyolefin is dissolved in 70-40% by weight of the solvent.

9. Process for producing a membrane according to claim 1, wherein the at least one polyolefin consists exclusively of carbon and hydrogen.

10. Process for producing a membrane according to claim 9, wherein the at least one polyolefin is a poly(4-methyl-1-pentene).

11. Process for producing a membrane according to claim 9, wherein the at least one polyolefin is a polypropylene.

12. Process for producing a membrane according to claim 9, wherein the at least one polyolefin is a mixture of a poly(4-methyl-1-pentene) and a polypropylene.

13. Process for producing a membrane according to claim 10, wherein the solvent is palm nut oil, dibutyl phthalate, dioctyl phthalate, dibenzyl ether, coconut oil, or a mixture thereof.

14. Process for producing a membrane according to claim 11, wherein the solvent is N,N-bis(2-hydroxyethyl)tallow amine, dioctyl phthalate, or a mixture thereof.

15. Process for producing a membrane according to claim 1, wherein the membrane is a hollow-fiber membrane.

* * * * *